United States Patent Office 3,585,110
Patented June 15, 1971

---

3,585,110
PROCESS FOR PREPARING 1-DEHYDRO STEROIDS
Dewey D. Y. Ryu, North Brunswick, Bong K. Lee, Old Bridge, and Richard W. Thoma, Somerville, N.J., assignors to E. R. Squibb & Sons, Inc., New York, N.Y.
No Drawing. Continuation-in-part of application Ser. No. 772,382, Oct. 31, 1968. This application July 1, 1970, Ser. No. 51,710
Int. Cl. C07c 167/14
U.S. Cl. 195—51          10 Claims

ABSTRACT OF THE DISCLOSURE

Disclosed herein is a process for preparing steroids unsaturated in the 1,2-position by utilization of concentrated nutrient and steroid substrates, added intermittently, so that the concentration of enzyme with cells and steroid product are increased by a large factor and an optional steroid cell ratio is maintained.

---

This application is a continuation-in-part of application Ser. No. 772,382, filed Oct. 31, 1968 and now abandoned.

This invention relates to a semi-continuous process for preparing steroids and, more particularly, to an improved enzymatic 1-dehydrogenation of steroids.

Enzymatic 1-dehydrogenation is known to the art. These procedures involve including steroids saturated in the 1,2-position in a culture of a growing 1-dehydrogenating microorganism or subjecting the steroid to the action of cells of a 1-dehydrogenating microorganism separated from the growth medium, or 1-dehydrogenase enzyme separated from the cells of such microorganisms. When conversion of steroids is to be conducted in the same environment in which growth of the organism and synthesis of enzymes is permitted, the growth medium is usually dilute and the steroid substrate is low in concentration because a high concentration of cells, caused by excess nutrients, often causes repression of induction of $\Delta^1$-dehydrogenase, whereas a high concentration of steroid in the presence of few cells often has an adverse effect on growth or production of desirable enzymes and causes poor yield and low product concentration. In other words, prior to this invention dilute solutions were utilized because of the adverse effects of high concentrations of the nutrient medium and the steroid substrate on production of enzymes and conversion of steroids.

It has now been discovered that by utilizing concentrated solutions of nutrient and steroid substrates, fermenting to allow conversion of the substrates to approximately 85 to 98% and thereafter replenishing the nutrient and substrate material and fermenting and replenishing nutrient and substrate at least once and no more than ten times, the resulting yield is substantially higher than that of any other batch process known heretofore. The semi-continuous process disclosed herein also results in an elimination of by-product formation when the 1-dehydrogenated steroid is recovered. The new processing technique is preferred to those employing enzyme-rich cells separated from the medium, since the operations associated with producing an enzyme-rich preparation are avoided.

The enzymatic 1-dehydrogenation can be accomplished either by including the steroid in a growing or mature culture of a microorganism known to effect 1-dehydrogenation of steroids, or by treating the steroid with the cells or mycelium of such a culture separated from the growth medium or 1-dehydrogenase enzymes separated from cells of such microorganisms.

Suitable microorganisms include members of the genera: Corynbacterium (e.g., *C. simplex*), Nocardia (e.g., *N. aurantia* and *N. asteroides*), Bacterium (e.g., *B. cyclooxydans*), Mycobacterium (e.g., *M. rhodochrous*), Bacillus (e.g., *B. sphaericus*), Septomyxa (e.g., *S. affinis*), Didymella (e.g., *D. lycopersici*), Calonectria (e.g., *C. decora*), Fusarium (e.g., *F. solani*), Cylindrocarpon (e.g., *C. radicicola*), Pseudomonas (e.g., *P. testosteroni*), Streptomyces (e.g., *S. lavendulae*), and also selected species of the genera: Protaminobacter, Alcaligenes, Alternaria, Ophiobolus and Pycinodithis.

If the microorganism is used per se, it is grown aerobically in a suitable nutrient medium, as known in the art; the steroid to be 1-dehydrogenated being added at an interval during which the conversion of steroid portion added previously is nearly complete.

In general, the conditions of culturing the microorganisms for the purpose of this invention are the same as those of culturing microorganisms for the production of antibiotics or vitamins. Thus the microorganism is grown in contact with (in or on) a suitable nutrient medium in the presence of an adequate supply of oxygen (air). A suitable nutrient medium essentially comprises from about 0.1 to about 1% by weight of a source of nitrogenous factors, and from about 0.1 to about 1% by weight of an assimilable source of carbon and energy in aqueous medium. The latter may be a carbohydrate, such as sucrose, molasses, glucose, maltose, starch or dextrin. The source of nitrogenous factors may be organic, e.g., soybean meal, corn steep liquor, meat extract, distiller's solubles, peptones and/or yeast (extract), hydrolyzed casein, or synthetic (i.e., composed of simple, synthesizable organic and inorganic compounds such as ammonium salts, alkali nitrates, amino acids or urea). The nutrient material may also include from about 0.1 to about 1% by weight of a phosphate source such as $KH_2PO_4$ and/or $K_2HPO_4$.

The concentrations which can be utilized in the practice of this invention and should be maintained are from about 0.3 to about 2 weight percentage of nutrient material in the aqueous medium and from about 0.75 to about 3.5 millimolar equivalent of steriod substrate. Preferred, however, are from about 0.3 to about 1 weight percentage of nutrient material and from about 1.2 to about 2.5 millimolar equivalent of steroid substrate. When the substrate steroid has been from about 85 to 98% converted to the 1-dehydrogenated end product, the nutrient and steroid substrate are replenished in amounts calculated to restore the concentration of each to that present initially. This procedure is repeated until the desired end point is reached, usually from 1 to 10 times, but preferably from about 2 to 7 times. It is to be understood that this end point can be arbitrarily fixed to a predetermined amount of steroid per liter as desired by the operator. However, it is suggested that the end point not exceed 10 grams per liter of medium.

As steroid substrate, any water-soluble 16,17-cycloborate ester of a steroid of the 16α,17α-dihydroxy-3-keto-$\Delta^4$-pregnene series may be used. Such compounds include the alkali metal salts (e.g., the sodium and potassium salts) and the ammonium salt of the 16,17-cycloborate esters. Particularly preferred are steroids of the general formula

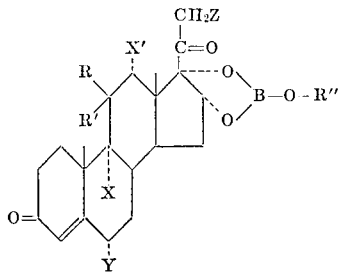

wherein R is hydrogen, R' is hydrogen or β-hydroxy, or together R and R' is keto; X and X' are hydrogen, halogen, hydroxy, lower alkoxy or lower alkyl, at least one X being hydrogen; Y is hydrogen, methyl, chloro or fluoro; Z is hydrogen, halogen, hydroxy or acyloxy; and R'' is a cation, preferably an alkali metal or ammonium.

Suitable steroid substrates include the alkali metal and ammonium salts of the 16,17-cycloborate esters of:

16α,17α-dihydroxyprogesterone,
16α,17α,21-trihydroxyprogesterone,
6α-methyl-16α,17α-dihydroxyprogesterone,
6α-chloro-16α,17α-dihydroxyprogesterone,
6α-fluoro-16α,17α-dihydroxyprogesterone,
16α,17α-dihydroxy-21-fluoroprogesterone,
16α,17α-dihydroxy-21-chloro-progesterone,
16α-hydroxyhydrocortisone,
16α-hydroxycortisone,
9α-halo-16α-hydroxyhydrocortisones (e.g., 9α-fluoro-16α-hydroxyhydrocortisone),
9α-halo-16α-hydroxycortisones,
12α-halo-16α-hydroxyhydrocortisones (e.g., 12α-fluoro-16α-hydroxyhydrocortisone),
12α-halo-16α-hydroxycortisones,
6α-methyl-16α-hydroxyhydrocortisone,
6α-methyl-16α-hydroxycortisone,
6α-fluoro-16α-hydroxyhydrocortisone,
6α-chloro-16α-hydroxyhydrocortisone,
9α-halo-6α-methyl-16α-hydroxyhydrocortisones,
12α-halo-6α-methyl-16α-hydroxyhydrocortisones,
9α-halo-6α-fluoro-16α-hydroxyhydrocortisones (e.g., 6α, 9α-difluoro-16α-hydroxyhydrocortisone),
9α-halo-6α-chloro-16α-hydroxyhydrocortisones (e.g., 6α, 9α-dichloro-16α-hydroxyhydrocortisone),
11β,16α,17α-trihydroxyprogesterone,
11-keto-16α,17α-dihydroxyprogesterone,
9α-halo-11β,16α,17α-trihydroxyprogesterones (e.g., 9α-fluoro-11β,16α,17α-trihydroxyprogesterone),
9α-halo-11-keto-16α,17α-dihydroxyprogesterones,
12α-halo-11β,16α,17α-trihydroxyprogesterones,
12α-halo-11-keto-16α,17α-dihydroxyprogesterones,
21-halo-11β,16α,17α-trihydroxyprogesterones,
9α,21-dihalo-11β,16α,17α-trihydroxyprogesterones,
6α,9α,21-trifluoro-11β,16α,17α-trihydroxyprogesterone and 6α,9α,21-trichloro-11β,16α,17α-trihydroxyprogesterone esters of those steroids having a 21-hydroxy group. Particularly preferred are those esters formed with hydrocarbon carboxylic acids of less than twelve carbon atoms, as exemplified by the alkanoic acids of less than twelve carbon atoms, the alkenoic acids of less than twelve carbon atoms, monocyclic aryl carboxylic acids, monocyclic aryl lower alkanoic acids, cycloalkanecarboxylic acids and cycloalkenecarboxylic acids.

The first portion of steroid substrate is added at the time the batch is inoculated, and successive portions of steroid, equal to or greater than the amount added at the beginning, are added at intervals when it is determined that conversion of steroid substrate to product is substantially complete, e.g., approximately 85 to 98% complete as determined by known assay techniques. When each steroid addition is made, concentrated nutrients are added to restore the available energy and growth substrates to approximately the concentrations that are obtained at the begining. When a desired concentration of steroidal product is obtained, recovery of steroid is effected by separating cells from the medium, extracting cells and accompanying solids with an organic solvent, concentrating by evaporation, and purifying steroidal product so obtained by recrystallization. Further, and most importantly, the soluble steroidal product, present in the cell-free liquor, is recovered by acidifying to pH 2 to 4 with mineral acid, recovering the steroid that precipitates, and extracting the residuum with an immiscible organic solvent.

It is to be understood that throughout the process the above preparation is utilized to determine the percentage of conversion which has been accomplished in the fermenting broth.

The following examples illustrate the process of this invention (all temperatures are in degrees centigrade):

EXAMPLE 1

*Arthrobacter simplex.*—ATCC 6946 is grown for two days at 25° C. on an agar slant of the following composition.

| Medium A: | Grams |
|---|---|
| Beef extract | 1.5 |
| Yeast extract | 3.0 |
| Peptone | 6.0 |
| Glucose | 1.0 |

Distilled water to 1 liter.
Autoclaved for thirty minutes at 121° C.

One ml. portions of a suspension obtained by washing the surface of one slant with 5 ml. of sterile water or one loopful (0.0025 ml.) of organisms from the slant are used to inoculate 50 ml. portions of the following medium contained in cotton-plugged 250 ml. Erlenmeyer flasks.

| Medium B: | Grams |
|---|---|
| Peptone | 5.0 |
| Tryptone | 5.0 |
| Yeast extract | 5.0 |
| Glucose | 20.0 |
| $CaCo_3$ | 2.5 |

Distilled water to 1 liter.
Autoclaved for thirty minutes at 121° C.

The inoculated flasks are incubated at 25° C. with rotary shaking in a radius of 2 inches at 280 revolutions per minute. After twenty-four hours, 0.1% (vol./vol.) culture broth is used to inoculate 50 ml. portions of the following medium contained in cotton-plugged 250 ml. Erlenmeyer flasks.

| Medium C: | Grams |
|---|---|
| Yeastamin (Vice Products Corporation, Chicago) | 1.0 |
| $KH_2PO_4$ | 1.0 |
| $K_2HPO_4$ | 1.0 |
| Glucose | 1.0 |

Tap water to 1 liter.
Autoclaved for twenty minutes at 121° C.

These second stage inoculum flasks are incubated under the same operating conditions as in the first inoculum stage. After twenty-four hours, 6% (vol./vol.) is used to inoculate 3 liters of medium C in a 7-liter jar-fermentor (New Brunswick Scientific, Inc., New Brunswick, N.J.). The fermentation conditions for the 3-liter jar-fermentor are:

Temperature range: 24~26° C.
pH range: 6.7~7.3
Aeration range: 0.5~0.8 vol. of air/vol. of broth/min.
Agitation speed range: 350~500 r.p.m.

At about three hours after inoculation 1.47 grams of steroid, 16α-hydroxy-9α-fluoro-hydrocortisone, prepared in the following manner is added to the 3-liter fermentation broth. The borate solution of 16α-hydroxy-9α-fluorohydrocortisone is prepared by adding one gram of this steroid substrate to 1.88 ml. of 0.164 molar sodium tetraborate solution and 3.12 ml. of 0.25 molar alcoholic potassium hydroxide, and by dissolving the steroid substrate (by mild heating) in a steam bath.

The concentration of this steroid substrate in borate solution is 200 mg./ml., and this represents 490 mg. of steroid substrate per liter of culture broth after the first addition of steroid substrate.

At about twenty-four hours after inoculation, 150 ml. of fifteen times concentrated medium C is replenished. This concentrated medium is prepared as follows.

C-1:                                                        Grams
  Yeastamin _____ 3.0
  $K_2HPO_4$ _____ 3.0
  $KH_2PO_4$ _____ 3.0
  Tap water to 100 ml. in 250 ml. Erlenmeyer flask.
C-2:
  Glucose _____ 3.0
  Tap water to 50 ml. in 250 ml. Erlenmeyer flask.

C-1 and C-2 are separately autoclaved for fifteen minutes at 121° C. and combined after sterilization. At the same time when the fermentation broth is replenished with the concentrated medium C, 2.94 grams of the steroid substrate in borate solution prepared as described above is also added to the fermentation broth. At about forty-eight hours after inoculation, the replenishment of nutrient is repeated and 4.41 grams of the steroid substrate in borax solution is added again to the fermentation broth. At about seventy-one hours after inoculation, replenishment of nutrient is repeated once again and 5.88 grams of the steroid substrate in borax solution is added to the fermentation broth. During the fermentation period the cell and enzyme concentrations increase in parallel with the 1-dehydrogenated steroid product. Sample is taken at about ninety-seven hours after inoculation, and the concentration of the 1-dehydrogenated steroid product, 9α-fluoro-16α-hydroxyprednisolone, is assayed according to the following method:

The samples are diluted with 0.1 N sulfuric acid to pH of 2.5±0.5 so that the steroid concentration in the sample would not exceed 300 microgram/ml. The free steroid product is extracted with methylisobutylketone and subjected to paper chromatography in a benzene-ethanol-water Whatman No. 1 system. The paper chromatograms are then eluted with 95% ethanol and read at wavelength 240 millimicrons in a spectrophotometer. Following this assay procedure, the 1-dehydrogenation is better than 90% complete in less than 100 hours and the yield is essentially quantitative in less than 144 hours.

In a similar manner by following the procedure of Example 1, any cycloborate ester of any 16α,17α-dihydroxy steroid of the 3-keto-Δ⁴-pregnene series can be converted to its 1-dehydro derivative.

This invention may be variously otherwise embodied within the scope of the appended claims.

What is claimed is:
1. A semi-continuous process for enzymatic 1-dehydrogenation of the 16α,17α-dihydroxy - 3 - keto-Δ⁴-pregnene of a steroid, which comprises fermenting a concentrated water-soluble 16,17 - cycloborate ester of a steroid substrate of the 16α,17α-dihydroxy - 3 - keto-Δ⁴-pregnene series in a concentrated aqueous nutrient medium wherein the concentration of steroid substrate is from about 0.75 to about 3.5 millimolar equivalent, and the concentration of nutrient in aqueous medium is from about 0.3 to about 2%, said concentrated nutrient medium containing enzymes of a 1-dehydrogenating microorganism, until the substrate is from about 85% to about 98% converted, replenishing the steroid substrate and nutrient medium to approximately their original concentrations, repeating said fermentation and replenishing at least once and thereafter removing the desired 1-dehydro steroid derivative.

2. A process in accordance with claim 1 wherein the concentration of aqueous nutrient and steroid substrate are from about 0.3 to about 1 weight percentage of nutrient material and from about 1.2 to about 2.5 millimolar equivalent of steroid substrate.

3. A process in accordance with claim 1 wherein the 1-dehydrogenating microorganism is *Arthrobacter simplex*.

4. A process in accordance with claim 1 wherein the steroid substrate is an alkali metal salt of 9α-fluoro-16α-hydroxyhydrocortisone 16,17-cycloborate.

5. A process in accordance with claim 1 wherein the nutrient medium comprises from about 0.1 to about 1% by weight of a nitrogen source and from about 0.1 to about 1% by weight of an assimilable source of carbon and energy.

6. A process in accordance with claim 5 wherein the nutrient medium includes in addition from about 0.1 to about 1% by weight of a phosphate source.

7. A process in accordance with claim 5 wherein the nitrogen source is yeast extract.

8. A process in accordance with claim 5 wherein the nitrogen source is hydrolyzed casein.

9. A process in accordance with claim 5 wherein the carbon source is glucose.

10. A process in accordance with claim 6 wherein the phosphate source is a mixture of $KH_2PO_4$ and $K_2HPO_4$.

References Cited
UNITED STATES PATENTS

| | | | |
|---|---|---|---|
| 2,902,410 | 9/1959 | Weintraub et al. | 195—51(E) |
| 2,905,592 | 9/1959 | Shull et al. | 195—51(E) |
| 2,992,973 | 7/1961 | Terumichi et al. | 195—51(E) |
| 3,037,912 | 6/1962 | Feldman et al. | 195—51(E) |
| 3,119,749 | 1/1964 | Thoma et al. | 195—51(E) |

ALVIN E. TANENHOLTZ, Primary Examiner

U.S. Cl. X.R.

195—117